Oct. 21, 1947.   M. GOLDSCHMIDT   2,429,355
SPINDLE ADAPTOR FOR PHOTOGRAPHIC CAMERAS
Filed Nov. 13, 1944
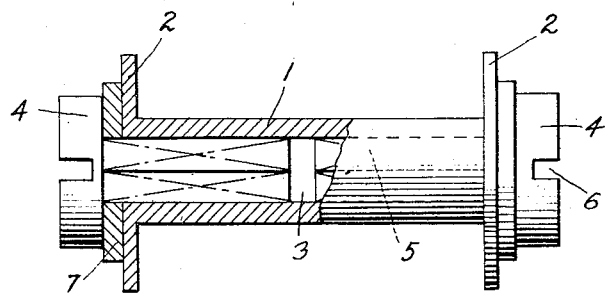
Inventor
M. Goldschmidt
By Glascock Downing Hechla
Attys.

Patented Oct. 21, 1947

2,429,355

UNITED STATES PATENT OFFICE 2,429,355

SPINDLE ADAPTOR FOR PHOTOGRAPHIC CAMERAS

Max Goldschmidt, London, England

Application November 13, 1944, Serial No. 563,203
In Great Britain November 22, 1943

2 Claims. (Cl. 242—71)

This invention relates to the provision of means which enable a camera or adaptor (viz., attachment to a plate camera adapted to carry a film roll) to be used with films of smaller width than the width of film for which the camera or adaptor has originally been designed. Use may be made of any kind of films both for daylight and dark room loading.

The object of the invention is to provide a roll film carrying spindle, suitable for the purpose above referred to, which will be of rigid construction and not liable to be displaced from its straight line mounting in the camera or adaptor.

The accompanying drawing illustrates in partsectional elevation, and by way of example, the construction according to the invention.

A hollow spindle 1 cast in one piece with two abutments 2 is provided with a longitudinal hole of preferably square cross-section 3 and is used in conjunction with two end members 4 comprising a portion of corresponding square cross-section 5, engaging in the said longitudinal hole and an abutment portion 6 of the usual construction to engage with the usual supports provided on the side walls of the camera and with the winding key. The length of the spindle 1 plus the length of the parts of the end members 4 lying outside the spindle correspond to the inner width of the camera and the distance between the two abutments 2 corresponds to the width of the smaller film to be used.

This construction can be easily used with cameras of different widths by inserting, if necessary, washers 7 of the required thickness between the abutments 2 and the portions 6 of the said end members.

In the case of the dark-room loading, the ends of the film are attached to the spindles in any convenient manner, for instance, by means of gummed tape.

The details for carrying the invention into effect may be modified without departing from the scope of the invention.

I claim:

1. For use with cameras or adaptors, spindles for carrying films of smaller width than those for which the camera or adaptor was originally designed, which spindles consist of a film carrying part which is hollow by being provided with a longitudinal hole and the length of which corresponds to the width of the small film and having two abutments cast in one piece therewith in combination with two end members having a part in sliding engagement with the hollow part of the spindle and an abutment part adapted to engage with the usual supports on the side walls of the camera or adaptor, the longitudinal hole of the film carrying part and the parts of the end members engaging therewith being of such cross-section that relative rotation between them is prevented and the length of the film carrying part plus the length of the abutment parts of the two end members corresponding to the width of the camera.

2. For use with cameras or adaptors, spindles for carrying films of smaller width than those for which the camera or adaptor was originally designed, which spindles consist of a film carrying part which is hollow by being provided with a longitudinal hole and the length of which corresponds to the width of the small film and having two abutments cast in one piece therewith in combination with two end members having a part in sliding engagement with the hollow part of the spindle and an abutment part adapted to engage with the usual supports on the side walls of the camera or adaptor, the longitudinal hole of the film carrying part and the parts of the end members engaging therewith being of such cross-section that relative rotation between them is prevented and in further combination with washers interposed between the abutments cast in one piece with the film carrying part and the abutments of the end members, and the length of the film carrying part plus the thickness of the washers and the length of the abutment parts of the two end members corresponding to the width of the camera.

MAX GOLDSCHMIDT.

REFERENCES CITED

The following references are of record in the file of this patent:

UNITED STATES PATENTS

| Number | Name | Date |
|---|---|---|
| 670,683 | Moore | Mar. 26, 1901 |
| 1,250,792 | Burdette | Dec. 18, 1917 |
| 1,362,397 | Colter et al. | Dec. 14, 1920 |
| 2,238,191 | Shelton | Apr. 15, 1941 |
| 2,312,887 | Ericksson | Mar. 2, 1943 |

FOREIGN PATENTS

| Number | Country | Date |
|---|---|---|
| 152,562 | Germany | Aug. 13, 1903 |